(12) United States Patent
Yasuhara et al.

(10) Patent No.: US 8,556,336 B2
(45) Date of Patent: Oct. 15, 2013

(54) VEHICLE BODY PANEL JOINING STRUCTURE

(75) Inventors: Shigeto Yasuhara, Shioya-gun (JP); Yuji Matsuura, Haga-gun (JP); Katsunari Sugawara, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/514,094

(22) PCT Filed: Oct. 25, 2010

(86) PCT No.: PCT/JP2010/068846
§ 371 (c)(1),
(2), (4) Date: Jun. 6, 2012

(87) PCT Pub. No.: WO2011/074326
PCT Pub. Date: Jun. 23, 2011

(65) Prior Publication Data
US 2012/0242113 A1 Sep. 27, 2012

(30) Foreign Application Priority Data
Dec. 16, 2009 (JP) ................................. 2009-285133

(51) Int. Cl.
*B60J 7/00* (2006.01)
(52) U.S. Cl.
USPC .................................................. 296/193.07
(58) Field of Classification Search
USPC ............... 296/193.07, 178, 191, 193.11, 218,
296/219, 223, 224, 29; 180/90; 211/85.8;
280/732, 730.1, 752
See application file for complete search history.

(56) References Cited
U.S. PATENT DOCUMENTS

| 3,833,254 | A | * | 9/1974 | Renner | .......................... 296/210 |
| 5,388,885 | A | | 2/1995 | Warren | |
| 5,882,065 | A | | 3/1999 | Koiwa et al. | |
| 6,905,165 | B2 | * | 6/2005 | Kawabe et al. | .......... 296/193.07 |

(Continued)

FOREIGN PATENT DOCUMENTS

GB 2482953 A 2/2012
JP 2-136771 11/1990

(Continued)

OTHER PUBLICATIONS

European Office Action, Application No. 10837356.4, dated Aug. 19, 2013, 5 pages.

(Continued)

*Primary Examiner* — Kiran B Patel
(74) *Attorney, Agent, or Firm* — Rankin, Hill & Clark LLP

(57) ABSTRACT

Disclosed is a vehicle body panel joining structure including a structural frame (30b) having a ridgeline in the lengthwise direction, which has one section joined to a first vehicle body panel (44) and another section joined to a second vehicle body panel (43); an overlap part (61) in which the first and second vehicle body panels are overlapped and which is arranged in such a way that the structural frame straddles the overlap part; a depressed part (64) which is disposed at a position avoiding the ridgeline on the structural frame and is abutted by the overlap part; and a spot welding part (65) which is joined to the depressed part (64), the first vehicle body panel, and the second vehicle body panel at the overlap part by means of spot welding.

3 Claims, 9 Drawing Sheets

(56) References Cited

U.S. PATENT DOCUMENTS

| | | |
|---|---|---|
| 6,926,352 B2 * | 8/2005 | Gotou et al. .................. 296/204 |
| 6,951,366 B2 * | 10/2005 | Tomita ..................... 296/187.08 |
| 7,118,167 B2 * | 10/2006 | Nakamura et al. ....... 296/193.07 |
| 7,178,861 B2 * | 2/2007 | Yamada et al. ............... 296/204 |
| 7,500,714 B2 * | 3/2009 | Abe et al. ................. 296/193.07 |
| 2005/0082879 A1 * | 4/2005 | Goto et al. .................. 296/204 |
| 2006/0158008 A1 * | 7/2006 | Nagashima .............. 296/203.03 |
| 2008/0315629 A1 * | 12/2008 | Abe et al. ................. 296/193.07 |
| 2012/0080907 A1 * | 4/2012 | Tamaki .................... 296/193.07 |
| 2012/0119544 A1 * | 5/2012 | Mildner et al. .......... 296/193.07 |
| 2012/0212009 A1 * | 8/2012 | Ishizono et al. ......... 296/193.07 |
| 2012/0248822 A1 * | 10/2012 | Mildner et al. .......... 296/193.07 |
| 2012/0267917 A1 * | 10/2012 | Weigl et al. .............. 296/193.07 |
| 2013/0049394 A1 * | 2/2013 | Urano et al. ................. 296/37.2 |

FOREIGN PATENT DOCUMENTS

| | | |
|---|---|---|
| JP | 6-144299 | 5/1994 |
| JP | 2005-162144 | 6/2005 |
| JP | 2009-018725 | 1/2009 |

OTHER PUBLICATIONS

European Search Report dated Jul. 19, 2013, Application No. 10837356.4, 3 pages.

* cited by examiner

VEHICLE BODY PANEL JOINING STRUCTURE

TECHNICAL FIELD

The present invention relates to a vehicle body panel joining structure.

Priority is claimed on Japanese Patent Application No. 2009-285133, filed Dec. 16, 2009, the content of which is incorporated herein by reference.

BACKGROUND ART

A vehicle body structure is known in which the vehicle body has a coupling member that couples the rear end of a front side frame arranged at both sides of an engine compartment along the longitudinal direction, the front end of a side sill arranged at both sides of a vehicle compartment along the longitudinal direction, and the front end of a center frame arranged at the center of the vehicle compartment in the width direction of the vehicle along the longitudinal direction.

The coupling member includes an outrigger extending obliquely to behind toward the outside in the width direction of the vehicle and connected to the front end of the side sill, and a center frame extension extending obliquely to behind toward the inside in the width direction of the vehicle and connected to the front end of the center frame, so that during a collision of the vehicle, the collision load backward input to the front side frame is dispersed to the side sill and the center frame in the width direction of the vehicle via the coupling member and the deformation of the vehicle compartment can be suppressed to a minimum due to the collision load (see Patent Document 1).

Citation List

Patent Document

[Patent Document 1] Japanese Unexamined Patent Application, First Publication No. 2009-18725

SUMMARY OF INVENTION

Technical Problem

However, in a vehicle body production form where floor components including a floor panel are located on a vehicle body front component including a coupling member and spot welding is performed thereon, since the joining portion of a floor panel and a lower dashboard partitioning a vehicle compartment and an inside of an engine compartment is positioned inside (rear side) of the coupling member, which thus causes an obstruction when spot welding, a hole is required to be provided at the coupling member to insert the welding gun thereinto.

Thus, there are problems in that disposition of a cover is required to block the hole, the number of parts increases, and a precision jig is required to arrange a member to align the exact position of the hole. In addition, there is a problem in that transmission of the impact load decreases at the portion where the hole is provided.

An object of an embodiment of the invention is to provide a vehicle body panel joining structure in which a jig can be simplified without an increase in the number of parts and the rigidity of the vehicle body can also be increased without causing a problem in the transmission of an impact load.

Solution to Problem

In an embodiment of the invention, a vehicle body panel joining structure that joins a first vehicle body panel and a second vehicle body panel, the vehicle body panel joining structure includes a structural frame having a ridgeline in the lengthwise direction, which has one section joined to the first vehicle body panel and another section joined to the second vehicle body panel; an overlap part in which the first and second vehicle body panels are overlapped and which is arranged in such a way that the structural frame straddles the overlap part; a depressed part which is disposed at a position avoiding the ridgeline on the structural frame and is abutted by the overlap part; and a spot welding part which is joined to the depressed part, the first vehicle body panel, and the second vehicle body panel at the overlap part by means of spot welding.

In the embodiment described above, a configuration may be employed wherein a contact width between a bottom wall of the structural frame and the overlap part is gradually narrowed along the transmission direction of an impact load and the depressed part is formed in a water drop shape in plan view.

In the embodiment described above, a configuration may further include a coupling member that couples the rear end of a front side frame arranged at both sides of an engine compartment along the longitudinal direction thereof, the front end of a side sill arranged at both sides of a vehicle compartment along the longitudinal direction, and the front end of a center frame arranged at the center of the vehicle compartment in the width direction of the vehicle along the longitudinal direction, wherein the coupling member includes an outrigger extending obliquely to behind toward the outside in the width direction of the vehicle and connected to the front end of the side sill, and a center frame extension extending obliquely to behind toward the inside in the width direction of the vehicle and connected to the front end of the center frame, wherein a floor panel is placed across the side sill and the center frame, wherein a rear edge of a lower dashboard dividing the engine compartment and the vehicle compartment is joined to the front edge of the floor panel with the overlap part, wherein the structural frame is the outrigger, wherein the first vehicle body panel is the lower dashboard, and wherein the second vehicle body panel is the floor panel.

Advantageous Effects of Invention

According to the embodiment of the invention, since the structural frame is not required to be provided with a hole to insert a spot welding gun thereinto, a cover or the like is not required to block the hole and the number of parts does not increase. In addition, since the depressed part and the overlap part may be simply matched, a positioning jig can be simplified. Furthermore, the depressed part does not divide the ridgeline of the structural frame, so that the rigidity of the vehicle body can be increased without a problem in the transmission of an impact load.

In addition, in a further configuration, reduction of the cross-sectional area of the structural frame is minimized and a decrease in the strength of the vehicle body can be suppressed.

In addition, in a further configuration, since the outrigger is not required to be provided with a hole to insert a spot welding gun thereinto, a cover or the like is not required to block the hole and the number of parts does not increase. In addition, since the depressed part and the overlap part may be simply matched, a positioning jig can be simplified. Furthermore, the depressed part does not divide the ridgeline of the outrigger so that the rigidity of the vehicle body can be increased without a problem in the transmission of an impact load.

DESCRIPTION OF EMBODIMENTS

Next, embodiments of the invention will be described based on the drawings.

Figure 1:
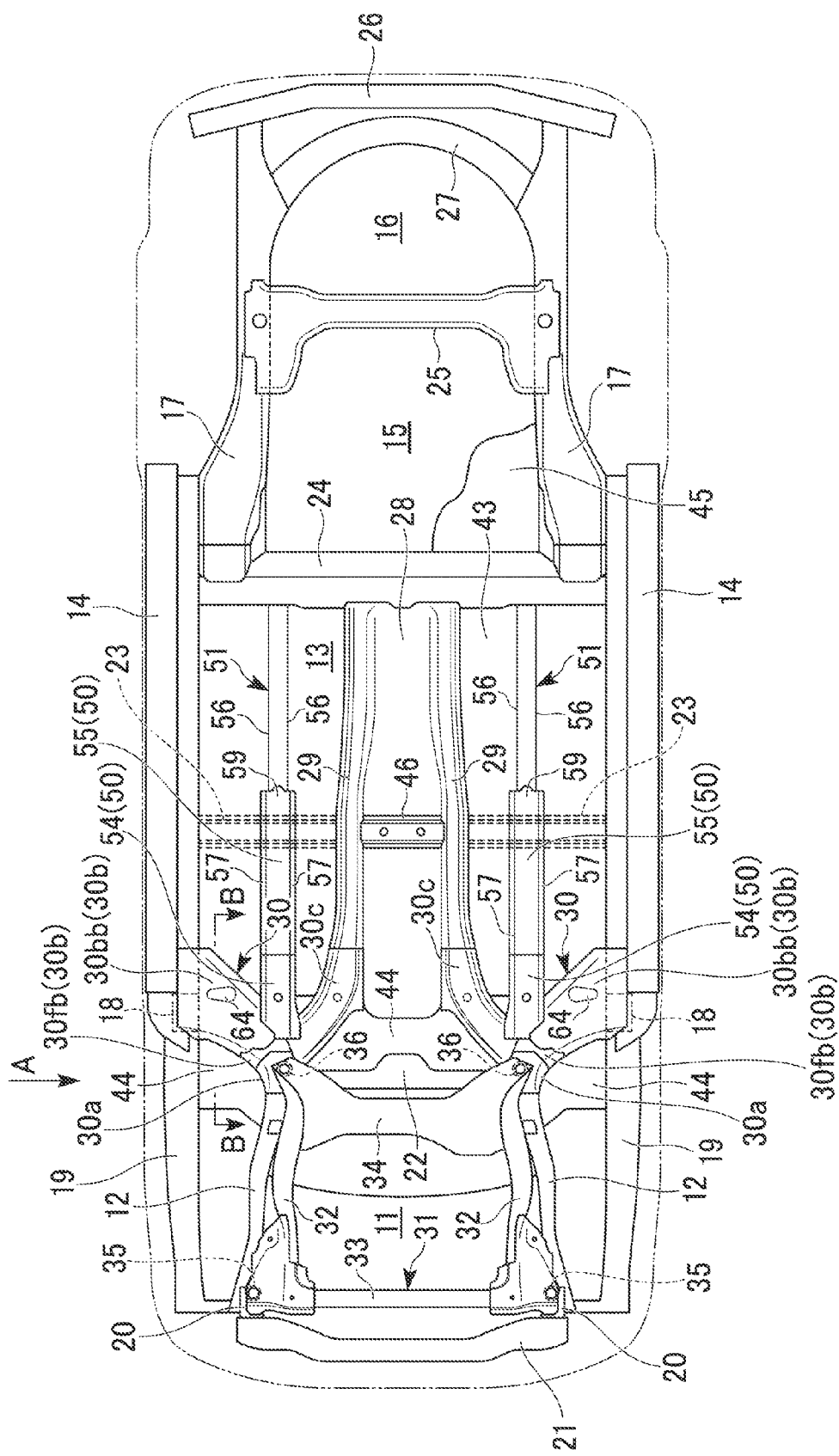
FIG. 1 is a view illustrating a vehicle body of an automobile of an embodiment according to the invention.
Figure 2:
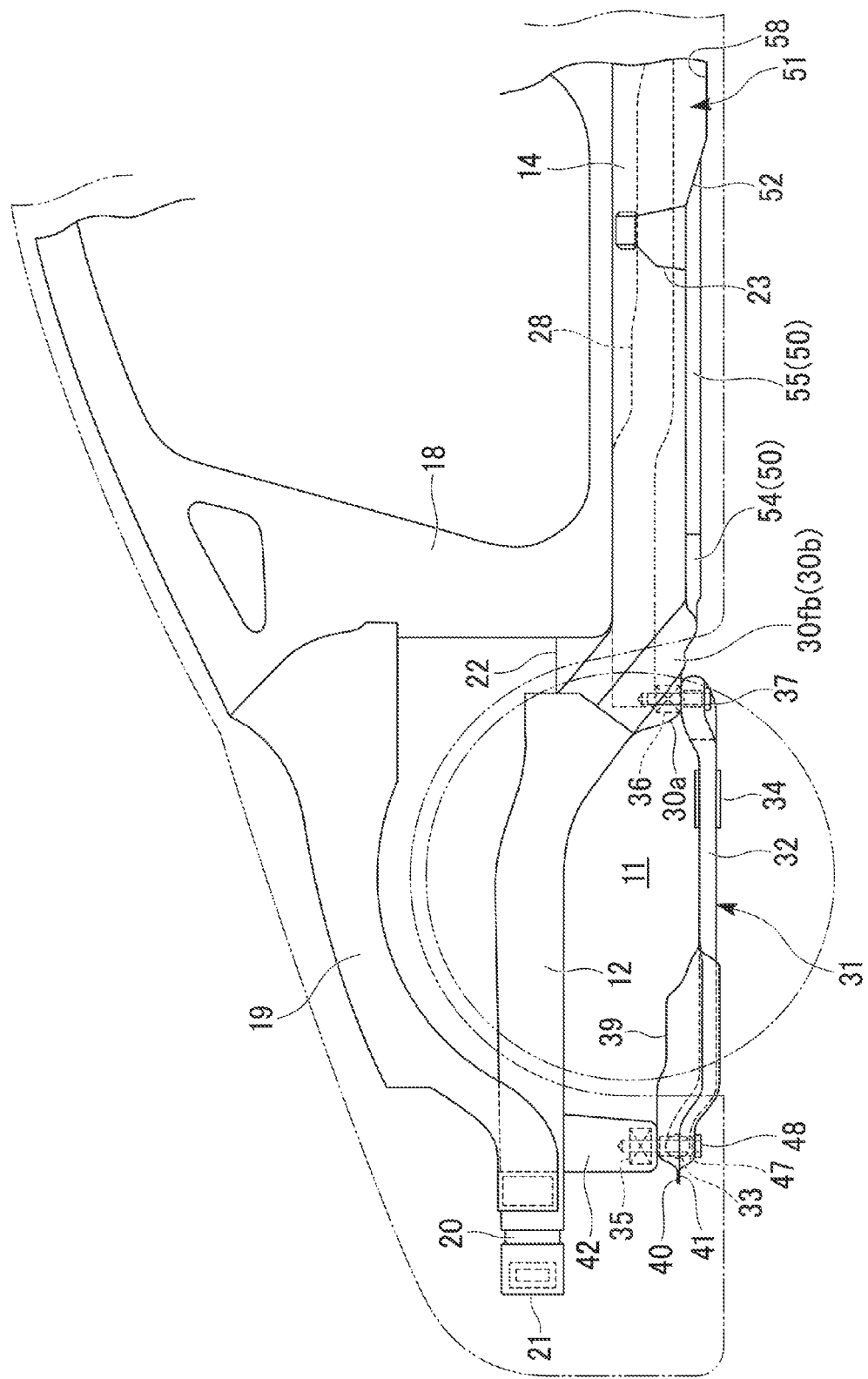
FIG. 2 is a view seen from an arrow A in FIG. 1

FIG. 1 is a view of a vehicle body of an automobile seen from a lower surface, and FIG. 2 is a view seen from arrow A in FIG. 1. The outer shape of the vehicle body is illustrated in dashed lines in FIGS. 1 and 2. As shown in FIGS. 1 and 2, a vehicle body frame of the automobile includes a pair of left and right front side frames 12 and 12 that have closed cross-sectional structures and extend in the longitudinal direction of the vehicle body along both left and right sides of an engine room 11, a pair of left and right side sills 14 and 14 that have closed cross-sectional structures and extend in the longitudinal direction of the vehicle body along both left and right sides of a vehicle compartment 13, a pair of left and right rear side frames 17 and 17 that have closed cross-sectional structures and extend in the longitudinal direction of the vehicle body along both left and right sides of a fuel tank housing part 15 and a trunk 16, and a pair of left and right upper members 19 and 19 that have closed cross-sectional structures, extend from the front end of the front side frames 12 and 12 upward to the rear and are coupled to the upper end of a pair of left and right front pillar lowers 18 and 18 rising from the front end of the left and right side sills 14 and 14.

In addition, the vehicle body frame includes a front bumper beam 21 that extends in the width direction of the vehicle body and has both ends connected to the front ends of the front side frames 12 and 12 via front side frame extensions 20 and 20, a dash lower cross member 22 that extends in the width direction of the vehicle body, provides a connection between the rear ends of the left and right front side frames 12 and 12, and forms a closed cross-sectional structure with a lower dashboard 44 (described below), a front cross member 23 that extends in the width direction of the vehicle body, forms a closed cross-sectional structure on a front floor panel 43 (described below), provides a connection between middle parts, in the longitudinal direction of the vehicle body of the left and right side sills 14 and 14, a middle cross member 24 that extends in the width direction of the vehicle body, provides a connection between the front ends of the left and right rear side frames 17 and 17, and forms a closed cross-sectional structure with a rear floor panel 45 (described below), a rear cross member 25 that extends in the width direction of the vehicle body, provides a connection between middle parts, in the longitudinal direction of the vehicle body of the left and right rear side frames 17 and 17, and forms a closed cross-sectional structure with the rear floor panel 45 (described below), a rear bumper beam 26 that extends in the width direction of the vehicle body and provides a connection between the rear ends of the left and right rear side frames 17 and 17, a rear end frame 27 that extends in the width direction and connects the left and right rear side frames 17 and 17 between the rear cross member 25 and the rear bumper beam 26, and a pair of left and right center frames 29 and 29 that extend along both the left and right sides of a floor tunnel 28 extending from the dash lower cross member 22 to the middle cross member 24, and form a closed cross-sectional structure with the front floor panel 43 (described below).

Furthermore, the vehicle body frame includes a pair of left and right coupling members 30 and 30 that couple the front side frames 12 and 12, the side sills 14 and 14, and the center frames 29 and 29, and a front sub-frame 31 that has a frame shape and is supported on a lower part of the left and right front side frames 12 and 12.

Next, the coupling member 30 will be described. Here, since the left and right coupling members 30 and 30 have a mirror symmetric shape, one thereof will be explained.

As shown in FIGS. 1 and 2, the coupling member 30 is a member which is formed in a press with a steel plate and the cross-section thereof is opened to the upper side, and includes an outrigger 30b, which joins to a rear end of the front side frame 12 and extends obliquely to the rear outside so as to be joined to a front end of the side sill 14. The outrigger 30b is configured such that a front outrigger 30fb and a rear outrigger 30bb, which have cross-sections opened to the upper side, are divided and joined together. A front sub-frame attaching stiffener 30a which projects downward in a cup shape is joined to a lower surface of the front outrigger 30fb.

In addition, the coupling member 30 includes a center frame extension 30c which is joined to a side wall inside the front outrigger 30fb and extends obliquely to inward in the width direction of the vehicle body and to backward, and then is joined to the front end of the center frame 29. The center frame extension 30c also has a cross-section opened to the upper side.

The outrigger 30b and the center frame extension 30c straddle the joint portion of the front floor panel 43 and the lower dashboard 44 so that a closed cross-sectional structure portion is formed at a lower side of the front floor panel 43 and the lower dashboard 44.

A rubber bush joint 36 is accommodated inside the front sub-frame attaching stiffener 30a and a rear part of the front sub-frame 31 is fastened and fixed by a bolt 37 passing through the rubber bush joint 36. Accordingly, the front sub-frame attaching stiffener 30a is set as a support point that elastically supports the rear part of the front sub-frame 31 arranged under the engine compartment 11 (see FIG. 2).

Figure 3:
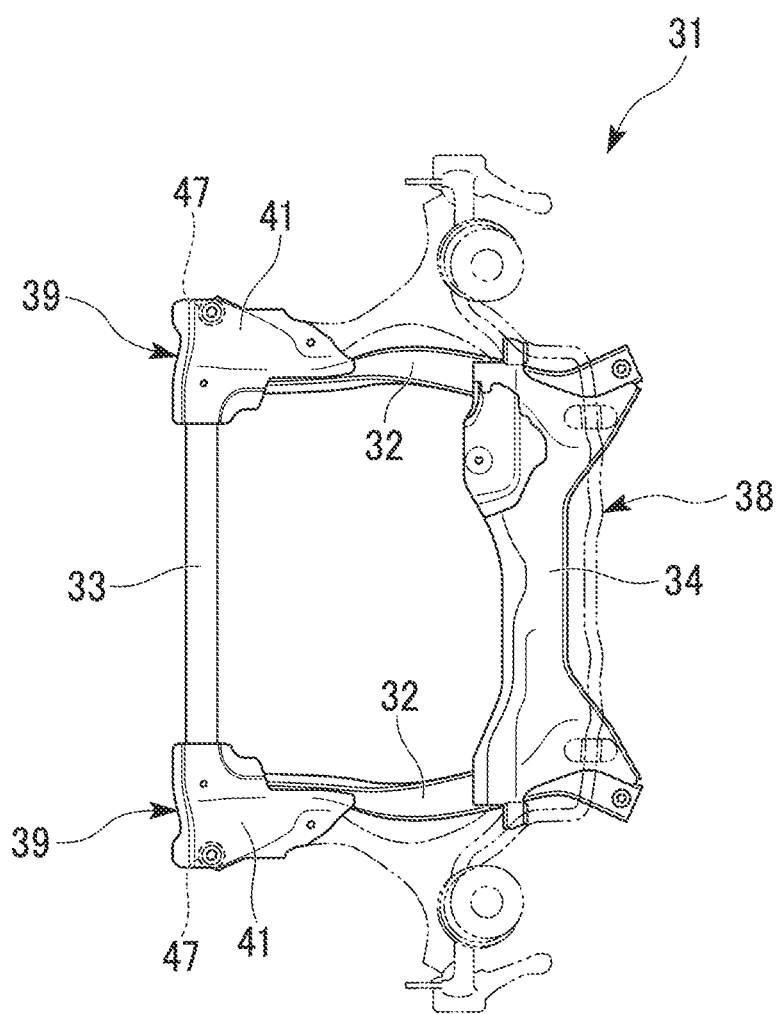
FIG. 3 is a bottom view of a front sub-frame.

FIG. 3 is a bottom view of the front sub-frame. As shown in FIG. 3, the front sub-frame 31 is configured such that a pair of left and right longitudinal frames 32 and 32, which are mainly hydroform molding products, are connected in a square frame shape to a front cross member 33 made of a round pipe material and a rear cross member 34 made of a press molding product. The front cross member 33 is arranged at a position higher than the longitudinal frames 32 and 32. A suspension part 38 shown in a dashed line is assembled at the front sub-frame 31.

Here, at the connecting part between the longitudinal frames 32 and 32 and the front cross member 33, a stiffening member 39 is disposed to wrap around a part of an end of the front cross member 33, a front end of the longitudinal frames 32, and an outside portion from the front end of the longitudinal frames 32 from the up and down direction to near the center thereof in the front and rear direction of the vehicle body. The stiffening member 39 is configured of an upper plate 40 and a lower plate 41, which is formed in a press.

A collar 47 is disposed inside and at the outer front of the stiffening member 39 and a bolt 48 is inserted into the collar 47 thereof. The stiffening member 39 is fastened and fixed at the front end of the front side frame 12 via rubber bush joints 35 and 35 inside the front sub-frame attaching bracket 42 mounted at a front-end lower portion of the front side frame 12. Accordingly, the lower surfaces of the front sub-frame attaching brackets 42 and 42 mounted at front-end lower surfaces of the front side frames 12 and 12 are configured as support points that elastically support the front end of the front sub-frame 31.

The front floor panel 43 is arranged at the vehicle compartment 13 between both edges of the floor tunnel 28 and the side sills 14 and 14. The center frame 29 is formed at both edges of the floor tunnel 28, in which an upper portion of the center frame 29 is opened to rise to the upper side after being dropped in the lower side from the surface of the front floor panel 43. The upper opening of the center frame 29 is closed and then the inside edge of each front floor panel 43 is joined to each side wall of the floor tunnel 28. In addition, the outside edge of each front floor panel 43 is joined to an inside wall of the side sill 14.

The front edge of the front floor panel 43 is joined to the lower and rear edge of the lower dashboard 44 from the upper side thereof. The rear edge of the front floor panel 43 is connected to the rear floor panel 45, which configures a floor surface of a fuel tank housing part 15, and a trunk 16 from the middle cross member 24. In addition, a bulkhead 46 is joined to a position that is along the front cross member 23 inside the floor tunnel 28 in the width direction of the vehicle body.

Figure 4:
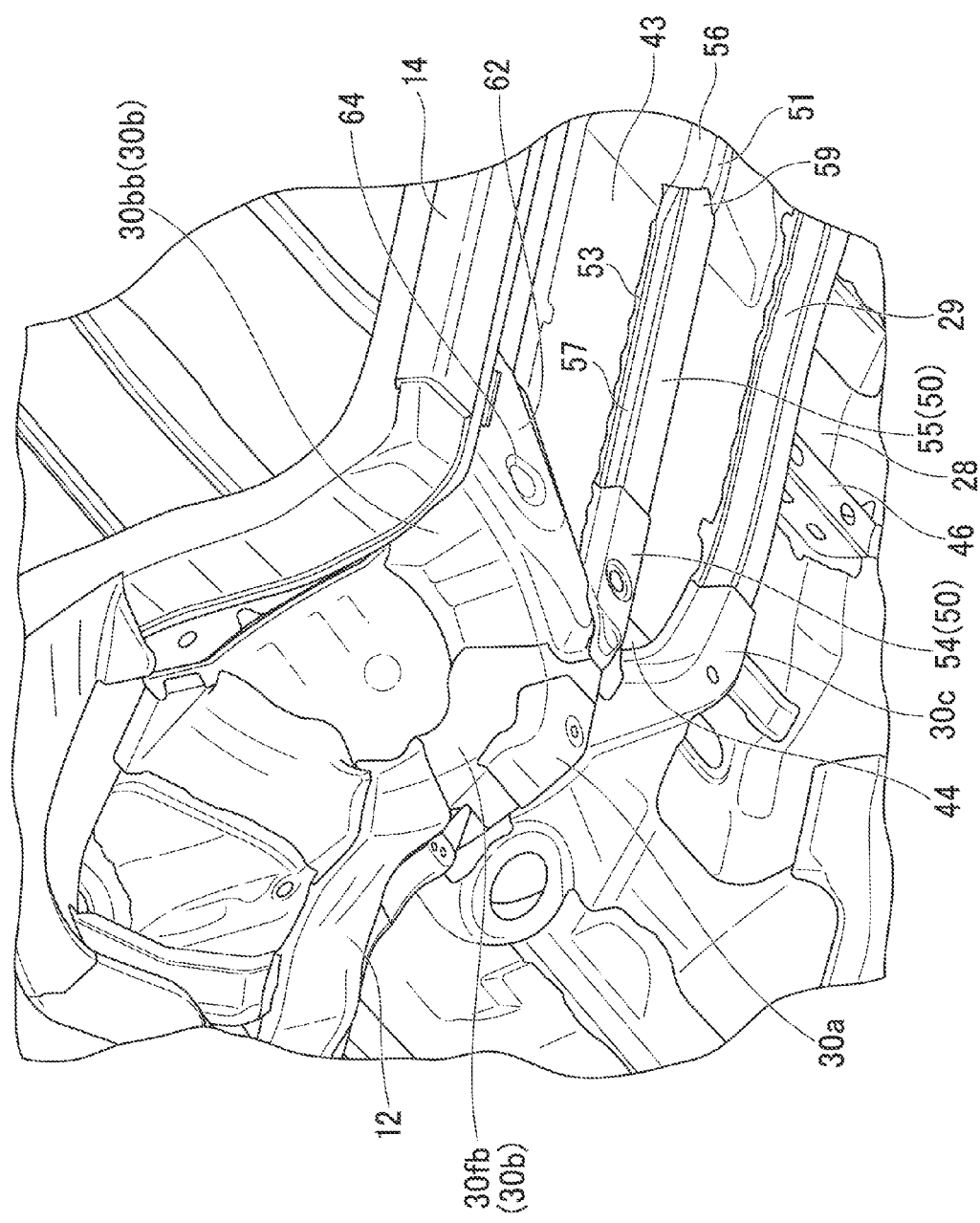
FIG. 4 is a perspective view of a main portion below a floor seen from below a vehicle compartment.
Figure 5:
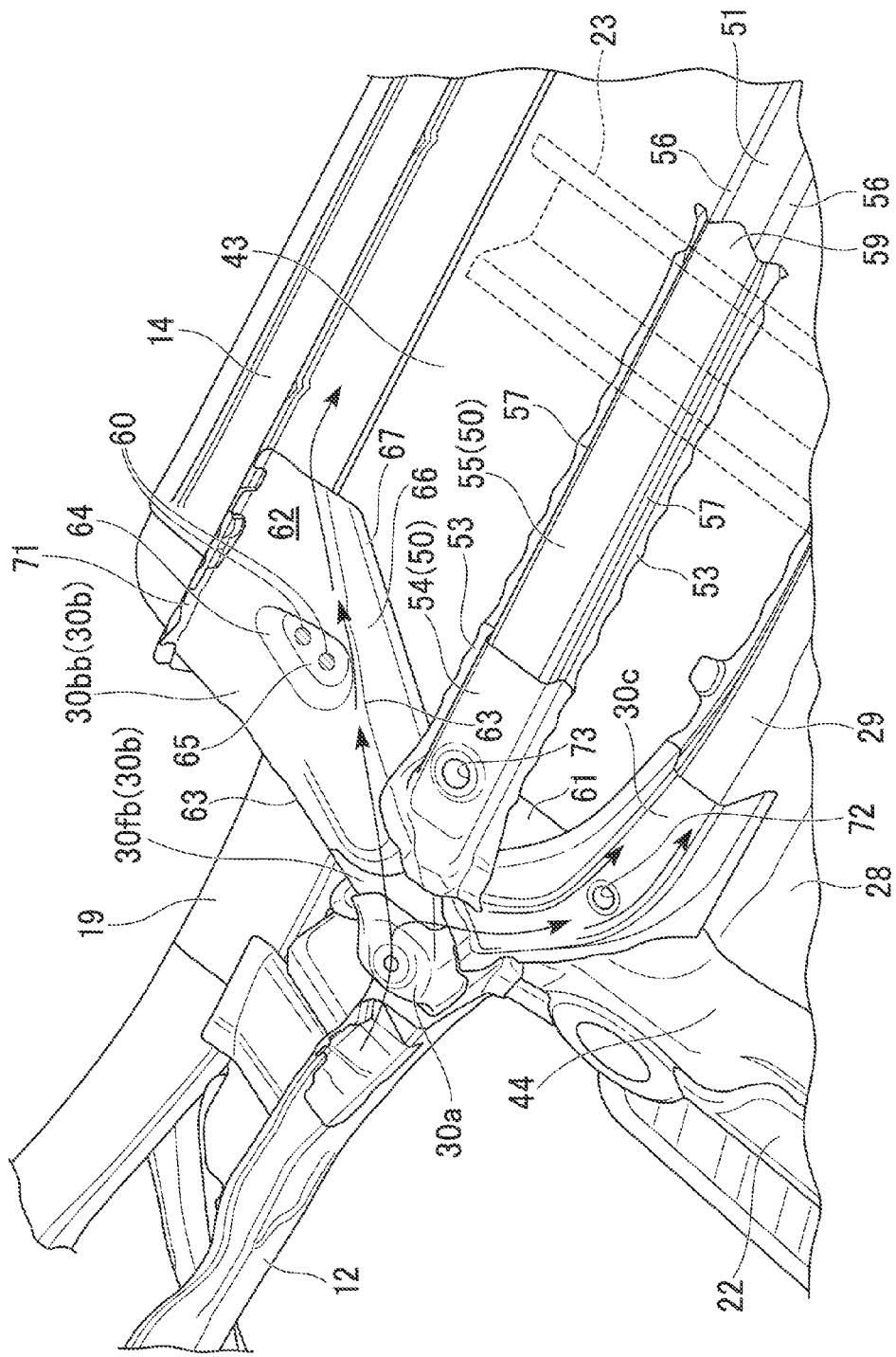
FIG. 5 is a perspective view near the coupling member seen from the rear side.
Figure 6:
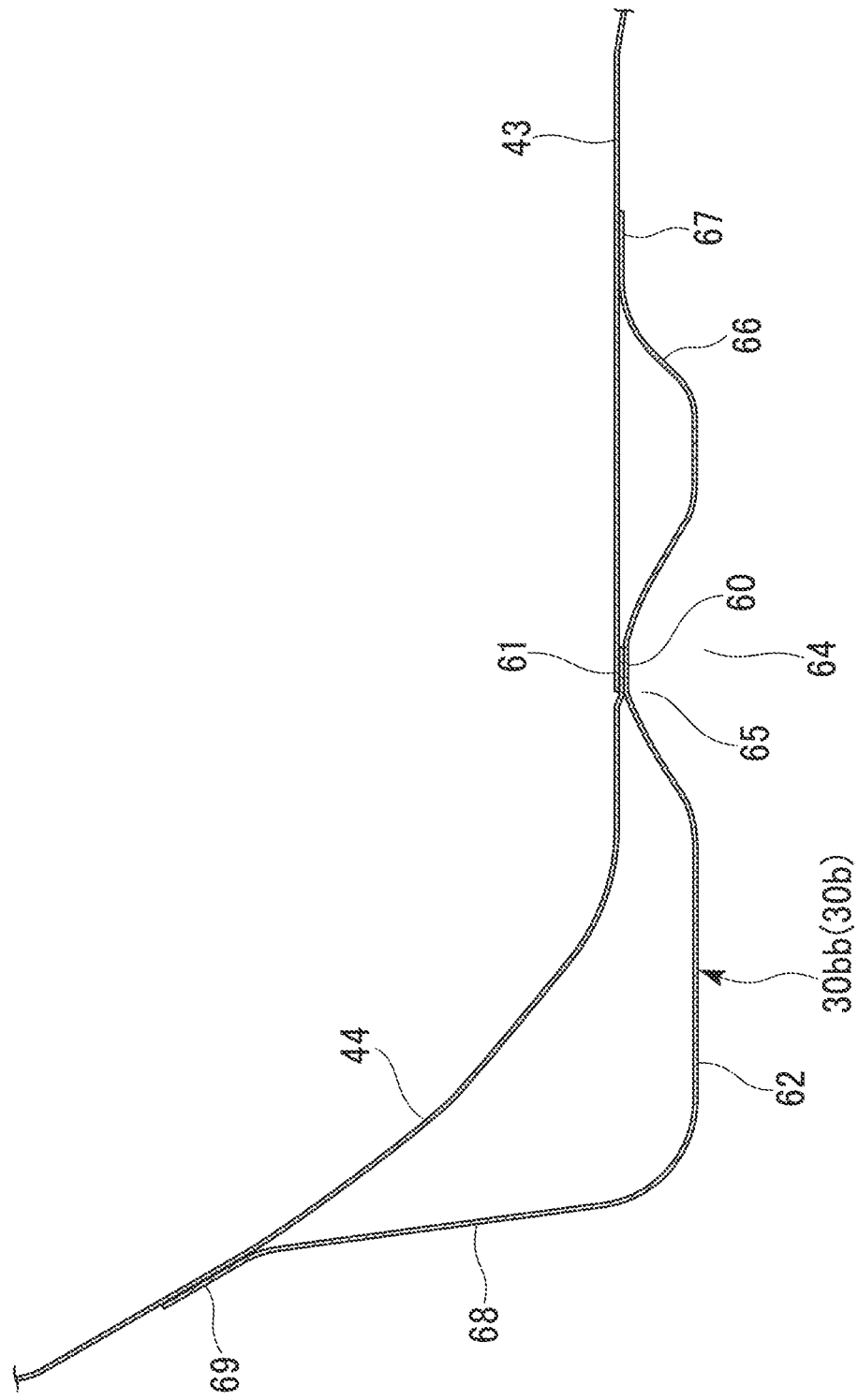
FIG. 6 is a cross-sectional view taken along a line B-B of FIG. 1.
Figure 7:
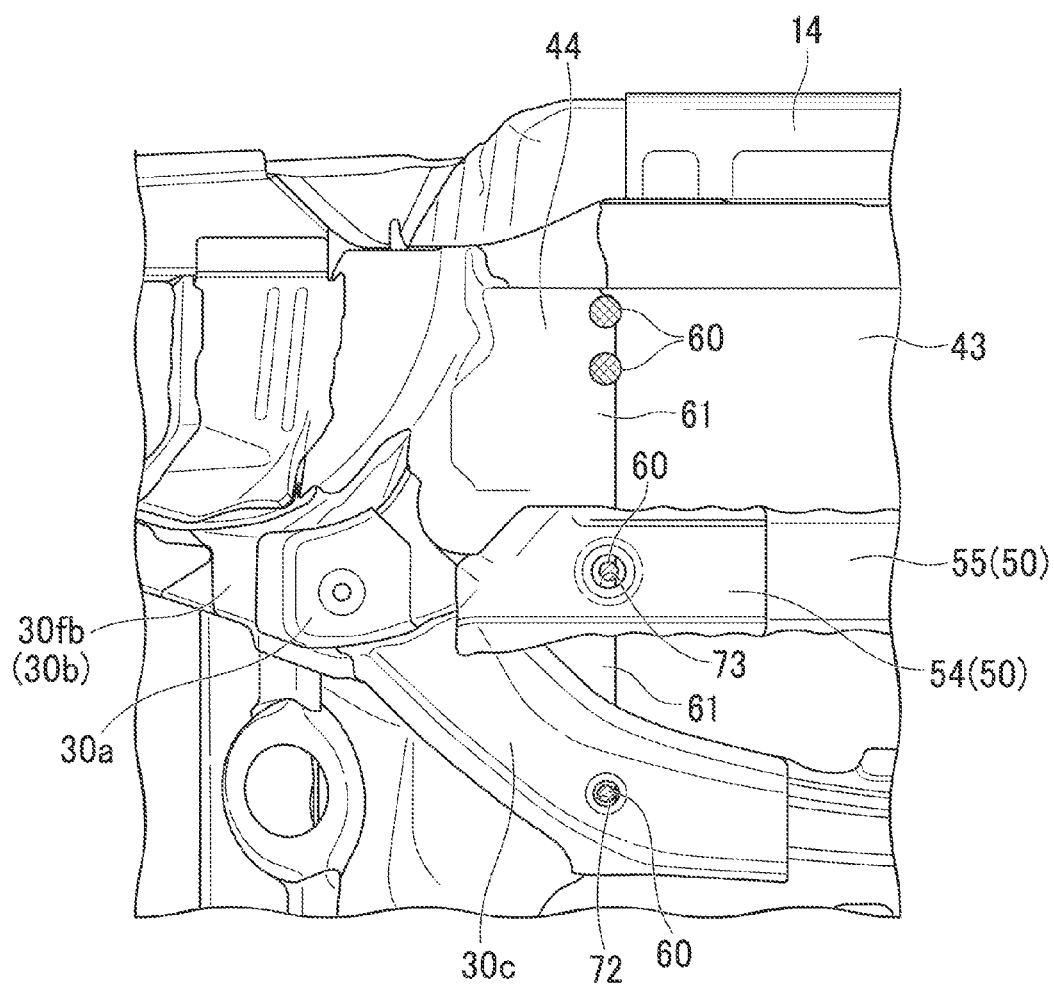
FIG. 7 is a bottom view illustrating a situation in which a rear outrigger is removed.
Figure 8:
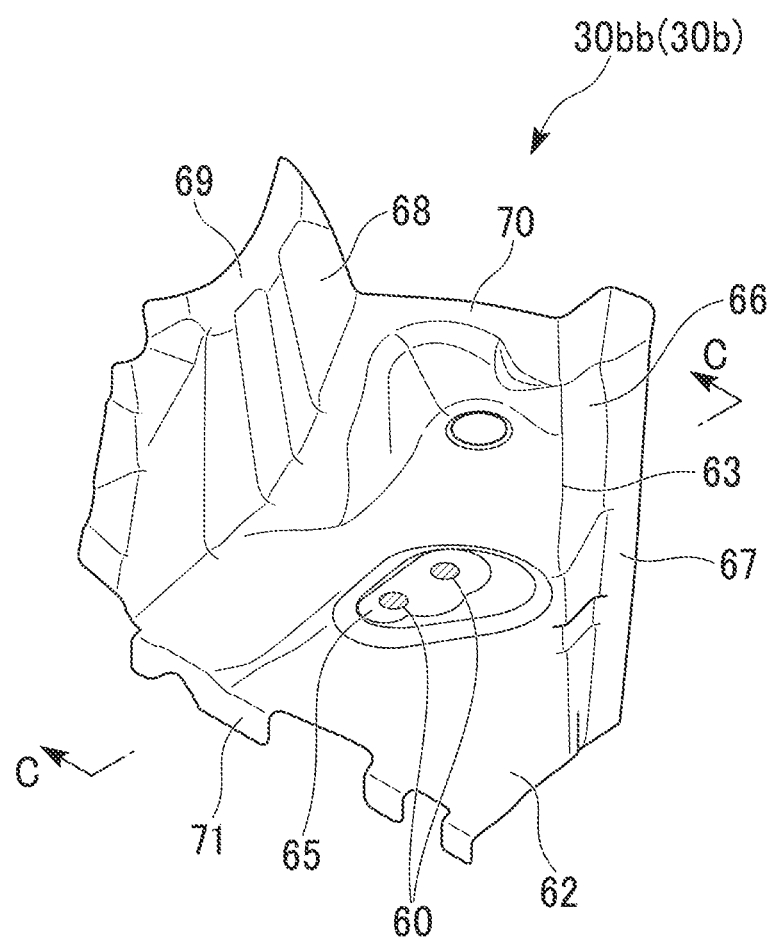
FIG. 8 is a perspective view of a rear outrigger seen from the rear side.
Figure 9:
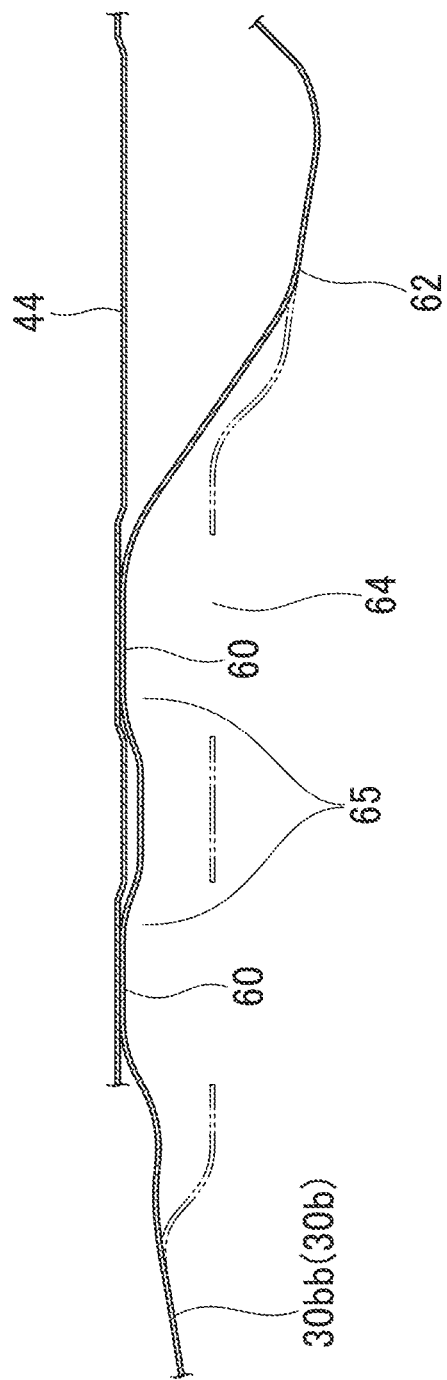
FIG. 9 is a cross-sectional view taken along a line C-C of FIG. 7.

FIG. 4 is a perspective view of a main portion below the floor seen from below the vehicle compartment, FIG. 5 is a perspective view of near the coupling member seen from the rear side, FIG. 6 is a cross-sectional view taken along a line B-B of FIG. 1, FIG. 7 is a bottom view illustrating a situation in which a rear outrigger is removed, FIG. 8 is a perspective view of the rear outrigger seen from the rear side, and FIG. 9 is a cross-sectional view taken along a line C-C of FIG. 7.

As shown in FIGS. 4 and 5, at both sides of the lower surface (illustrating only the left side in FIG. 4) of the front of the front floor panel 43, specifically, at a root portion of the outrigger 30b and the center frame extension 30c of the coupling member 30 which are positioned behind the front sub-frame attaching stiffener 30a, a stiffener 50 is extended behind the vehicle body so as to cover the root portion, in which the stiffener 50 is joined to the outrigger 30b, the center frame extension 30c, the lower dashboard 44, and the front floor panel 43. The stiffener 50 is a member having a U-shaped cross-section opened upward and joins a flange part 53 disposed at the circumferential edge thereof so that a closed cross-sectional structure is formed under the lower dashboard 44 and the front floor panel 43.

The stiffener 50 extends behind over the arrangement position of the front cross member 23, and a bead 51 having a U-shaped cross-section and including a cross-sectional shape fitted in the cross-sectional shape of the stiffener 50 is recessed at the rear portion of the front floor panel 43. The bead 51 is connected to the stiffener 50 and a rear end of the bead 51 is coupled to the middle cross member 24 arranged at behind the front cross member 23.

Here, the stiffener 50 is configured of a front stiffener 54 having high strength and a rear stiffener 55 having low strength. A rear end position of the front stiffener 54 is aligned with a rear end position of the outrigger 30b, in other words, the rear outrigger 30bb and a rear end of the rear stiffener 55 is continued to the bead 51.

An inclined part 52 which is connected to the rear end of the stiffener 50 and inclines from in front of to behind the stiffener 50 is formed at the front end of the bead 51. Specifically, as shown in FIG. 2, the inclined part 52 of the bead 51 is portioned where a front portion of a bottom wall 58 is inclined and a rear edge 59 of the stiffener 50 (rear stiffener 55) is joined to the bottom wall 58, and a side wall 56 of the bead 51 corresponding to the inclined part 52 is joined to a side wall 57 of the stiffener 50 (rear stiffener 55).

As shown in FIGS. 6 and 7, the front edge of the front floor panel 43 is overlapped at the rear edge of the lower dashboard 44 from the upper side thereof and then an overlap part 61 is formed. The spot welding is performed at two places of the overlap part 61. In the assembly process of the vehicle body, the overlap part 61 is an overlap part that is set as a joining margin when assembling a floor component including the front floor panel 43 and a vehicle body front component including the lower dashboard 44 consisting of the coupling member 30.

Here, the floor component represents an assembly of the panel component parts modulated including the front floor panel 43. The vehicle body front component means an assembly of the panel component parts modulated including the lower dashboard of the engine compartment 11.

In addition, in FIG. 7, two hit points 60 and other hit points 60 and 60 of the spot welding of the rear outrigger 30bb are illustrated in hatching.

At a bottom wall 62 of the rear outrigger 30bb of the coupling member 30, in other words, at a position (see FIG. 5) to avoid ridgelines 63 and 63 (in particular, the ridgeline of the rear side) of the rear outrigger 30bb in the lengthwise direction and at a position corresponding to directly under the overlap part 61 where the lower dashboard 44 and the front floor panel 43 are overlapped, as shown in FIG. 6, a depressed part 64, which contacts the overlap part 61 at the rear surface from the lower side thereof is recessed upwardly.

Specifically, the depressed part 64 is a spot welding part 65 that is provided for performing the spot welding of the rear outrigger 30bb at the same time when performing spot welding of the overlap part 61 where the lower dashboard 44 and the front floor panel 43 are overlapped. The depressed part 64 is formed in a water drop shape in plan view so that a contact width between the overlap part 61 and the bottom wall 62 of the rear outrigger 30bb is gradually narrowed along the transmission direction (shown in arrows in FIG. 5) of the impact load. Otherwise, the depressed part 64 in plan shape is an egg shape, an oval shape having one symmetry axis, or a teardrop shape. Otherwise, the depressed part 64 in plan shape has a smooth curved shape having substantially one symmetry axis and two non-symmetry axes (or, closed curve).

Here, as shown in FIG. 5, similar to the rear outrigger 30bb, since the center frame extension 30c and the front stiffener 54 straddle the overlap part 61, holes 72 and 73 are formed at positions corresponding to the spot welding part 65 of the overlap part 61 respectively, and the spot welding gun can be inserted into the holes 72 and 73.

As shown in FIG. 8, the rear outrigger 30bb includes two side walls 66 and 68 rising from the bottom wall 62, and a flange part 67 of one side wall 66 is joined to a rear surface of the front floor panel 43 and a flange part 69 of the other side wall 68 is joined to a rear surface of the lower dashboard 44, a front edge 70 of the bottom wall 62 is joined to the front outrigger 30fb, and a flange part 71 of a rear edge of the bottom wall 62 is joined to the side sill 14. As shown in FIG. 9, the depressed part 64 of the rear outrigger 30bb formed at the bottom wall 62 is the spot welding part 65 including two hit points 60 and 60, and two hit points 60 and 60 are arranged side-by-side in the width direction of the vehicle.

According to the embodiment described above, the front edge of the floor component including the front floor panel 43 is placed on the rear edge of the vehicle body front component provided with the lower dashboard 44 including the coupling member 30, and then the overlap part 61 is formed. In a case where the overlap part 61 is subject to the spot welding, since the depressed part 64 of the bottom wall 62 of the rear outrigger 30bb of the coupling member 30 contacts the spot welding parts 65 and 65 of the lower dashboard 44 and the front floor panel 43 in a state where the floor component and the vehicle body front component are arranged at the assembling position, the spot welding gun is pressed against the depressed part 64 and the spot welding can be performed in two places at the front floor panel 43, the lower dashboard 44 and the rear outrigger 30bb.

Accordingly, as shown in a dashed line in FIG. 9, it is not required to provide two holes at the bottom wall 62 of the rear outrigger 30bb to insert the spot welding gun as in the related art, so that covers or the like are not required to block the holes after assembly and thus an increase of the number of parts can be suppressed.

In addition, since the depressed part 64 is formed by having a certain width, a bottom part of the depressed part 64 of the rear outrigger 30bb may be simply matched with the vicinity of the overlap part 61 where the rear edge of the lower dashboard 44 and the front edge of the front floor panel 43 are overlapped, so that it is possible to simplify the jig compared to the related art where the insert hole of the spot welding gun is required to be exactly positioned with the spot welding parts 65 and 65 of the overlap part 61.

Thus, the depressed part 64 is formed at the position where the ridgeline 63 of the rear outrigger 30bb is not divided, so that there is no problem in the transmission of the impact load and the rigidity of the vehicle body can also be improved.

In other words, during collision of the front of the vehicle, the input load acting on the front part of the vehicle body is transmitted by the coupling member 30 to the side sills 14 and 14 of both sides in the width direction of the vehicle body and the center frames 29 and 29 of the center part in the width direction of the vehicle body, so as to disperse in the width direction of the vehicle body (illustrating in the arrows in FIG. 5). When the load is transmitted to the rear outrigger 30bb, since the depressed part 64 does not divide the ridgelines 63 and 63 between the bottom wall 62 and the side walls 66 and 68 of the rear outrigger 30bb, the impact load can be reliably transmitted to the side sill 14.

Thus, since the contact width between the overlap part 61 and the bottom wall 62 of the rear outrigger 30bb is formed to be gradually narrowed along transmission directions of the impact load, and the depressed part 64 is formed in the water drop shape in plan view, the reduction of the cross-sectional area of the rear outrigger 30bb is minimized and the decrease in the strength of the vehicle body can be suppressed.

In addition, the invention is not limited to the embodiment described above and for example, since the center frame extension 30c and the front stiffener 54 also straddle the overlap part 61, as shown in FIG. 5, the holes 72 and 73 are formed at the positions corresponding to the overlap part 61 respectively, however the holes 72 and 73 may be configured as the depressed part similar to the depressed part 64 and may contact the overlap part 61. According to the configuration described above, even in the arrangement positions of the center frame extension 30c and the front stiffener 54, it is possible to simplify the jig similar to the arrangement positions of the outrigger 30b, and the rigidity of the vehicle body can be improved without a problem in the transmission of the load.

REFERENCE SIGNS LIST 63 ridgeline
30b outrigger (structural frame)
44 lower dashboard (vehicle body panel)
43 front floor panel (vehicle body panel, floor panel)
61 overlap part
64 depressed part
65 spot welding part
62 bottom wall
11 engine compartment
12 front side frame
14 side sill
29 center frame
30 coupling member
30c center frame extension
13 vehicle compartment

The invention claimed is:

1. A vehicle body panel joining structure that joins a first vehicle body panel and a second vehicle body panel, the vehicle body panel joining structure comprising:
   a structural frame that includes a bottom wall and a pair of side walls that are arranged opposite to each other across the bottom wall, and that has ridgelines formed by the bottom wall and the side walls in the lengthwise direction, one of the side walls having a side wall flange joined to the first vehicle body panel and the other of the side walls having a side wall flange joined to the second vehicle body panel;
   an overlap part in which the first and second vehicle body panels are overlapped and which is arranged in such a way that the structural frame straddles the overlap part;
   a depressed part that is disposed at a position avoiding the ridgelines in the bottom wall of the structural frame and that is abutted by the overlap part; and
   a spot welding part that is joined to the depressed part, an end portion of the first vehicle body panel, and an end portion of the second vehicle body panel at the overlap part by means of spot welding.

2. The vehicle body panel joining structure according to claim 1, further comprising a coupling member that couples a rear end of a front side frame arranged at both sides of an engine compartment along the longitudinal direction thereof, a front end of a side sill arranged at both sides of a vehicle compartment along the longitudinal direction, and a front end of a center frame arranged at the center of the vehicle compartment in the width direction of the vehicle along the longitudinal direction,
   wherein the coupling member includes an outrigger extending obliquely to behind toward the outside in the width direction of the vehicle and connected to the front end of the side sill, and a center frame extension extending obliquely to behind toward an inside in the width direction of the vehicle and connected to the front end of the center frame,
   wherein a floor panel is placed across the side sill and the center frame,
   wherein a rear edge of a lower dashboard dividing the engine compartment and the vehicle compartment is joined to the front edge of the floor panel with the overlap part, wherein the structural frame is the outrigger,
wherein the first vehicle body panel is the lower dashboard, and
wherein the second vehicle body panel is the floor panel.

3. The vehicle body panel joining structure according to claim 2,
wherein a contact width between a bottom wall of the structural frame and the overlap part is gradually narrowed along transmission directions of an impact load and the depressed part is formed in a water drop shape in plan view.

* * * * *